United States Patent
Zhou et al.

(10) Patent No.: US 12,099,879 B2
(45) Date of Patent: Sep. 24, 2024

(54) DATA PROCESSING METHOD AND CORRESPONDING APPARATUS BASED ON STATUS INFORMATION OF PROCESSORS

(71) Applicant: HUAWEI TECHNOLOGIES CO., LTD., Guangdong (CN)

(72) Inventors: Zheng Zhou, Beijing (CN); Hui Ni, Beijing (CN); Lei Wan, Beijing (CN); Yongqiang Gao, Beijing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 401 days.

(21) Appl. No.: 17/401,509

(22) Filed: Aug. 13, 2021

(65) Prior Publication Data

US 2021/0373970 A1    Dec. 2, 2021

Related U.S. Application Data

(63) Continuation of application No. PCT/CN2020/074303, filed on Feb. 5, 2020.

(30) Foreign Application Priority Data

Feb. 14, 2019    (CN) .......................... 201910114432.8

(51) Int. Cl.
*G06F 9/50*    (2006.01)
*G06F 9/48*    (2006.01)
(Continued)

(52) U.S. Cl.
CPC .......... *G06F 9/5044* (2013.01); *G06F 9/4881* (2013.01); *G06F 9/5038* (2013.01);
(Continued)

(58) Field of Classification Search
None
See application file for complete search history.

(56) References Cited

U.S. PATENT DOCUMENTS 5,459,864 A * 10/1995 Brent ................... G06F 11/2017
                                                              714/E11.015
5,954,781 A      9/1999 Slepian et al.
(Continued)

FOREIGN PATENT DOCUMENTS

CN        102582621 A     7/2012
CN        104102749 A    10/2014
(Continued)

OTHER PUBLICATIONS

Office Action issued in CN201910114432.8, dated May 6, 2021, 8 pages.

(Continued)

*Primary Examiner* — Adam Lee

(57) ABSTRACT

A data processing method applied to a data processing apparatus is disclosed. The data processing apparatus includes a central processor and a sensor processor set, and the sensor processor set includes at least one sensor processor. The data processing method comprises obtaining status information of at least one sensor processor in a sensor processor set; determining task switching information based on status information of the at least one sensor processor and/or status information of the central processor, and processing the data processing task switched from the first sensor processor to the central processor, and/or processing, the data processing task switched from the central processor to the second sensor processor. The task switching information indicates to switch a data processing task of a first sensor processor to the central processor, or switch a data processing task of the central processor to a second sensor processor, and the first sensor processor and the second sensor processor each is a sensor processor in the sensor processor set.

20 Claims, 13 Drawing Sheets

(51) Int. Cl.
  *G06F 18/25* (2023.01)
  *G05D 1/00* (2006.01)
(52) U.S. Cl.
  CPC ............ *G06F 9/505* (2013.01); *G06F 9/5083* (2013.01); *G06F 18/251* (2023.01); *G05D 1/0221* (2013.01)

(56) References Cited

U.S. PATENT DOCUMENTS

| | | | |
|---|---|---|---|
| 6,002,996 A | 12/1999 | Burks et al. | |
| 7,665,092 B1* | 2/2010 | Vengerov | G06F 9/5088 |
| | | | 718/105 |
| 7,898,545 B1* | 3/2011 | Alben | G06F 9/5044 |
| | | | 345/503 |
| 9,166,597 B1* | 10/2015 | Denisenko | H03K 19/17728 |
| 9,323,314 B1* | 4/2016 | Jia | G06F 9/5094 |
| 9,811,335 B1* | 11/2017 | Khainovski | G06F 9/30196 |
| 10,803,324 B1* | 10/2020 | Shen | G06F 18/214 |
| 2002/0099759 A1* | 7/2002 | Gootherts | G06F 9/5088 |
| | | | 718/105 |
| 2010/0122044 A1* | 5/2010 | Ford | G06F 9/30036 |
| | | | 712/217 |
| 2010/0332014 A1* | 12/2010 | Albarede | H01J 37/32935 |
| | | | 700/110 |
| 2012/0144157 A1* | 6/2012 | Crew | G06F 9/5044 |
| | | | 712/30 |
| 2012/0185569 A1* | 7/2012 | Das | H04W 4/38 |
| | | | 709/219 |
| 2012/0254878 A1* | 10/2012 | Nachman | G06F 1/3293 |
| | | | 718/102 |
| 2014/0115128 A1* | 4/2014 | Myrberg | G06F 9/5061 |
| | | | 709/221 |
| 2014/0137124 A1* | 5/2014 | Szalay | G06F 9/5072 |
| | | | 718/102 |
| 2014/0143423 A1* | 5/2014 | Arya | H04L 47/70 |
| | | | 709/226 |
| 2014/0176574 A1* | 6/2014 | Bakalash | G06T 15/06 |
| | | | 345/505 |
| 2014/0192134 A1* | 7/2014 | Jung | H04N 21/41407 |
| | | | 348/14.02 |
| 2014/0237017 A1* | 8/2014 | Adkar | H04L 67/10 |
| | | | 709/201 |
| 2014/0302818 A1* | 10/2014 | Fyke | G06F 3/0488 |
| | | | 455/411 |
| 2015/0011160 A1* | 1/2015 | Jurgovan | H04W 76/14 |
| | | | 455/41.1 |
| 2015/0087264 A1* | 3/2015 | Goyal | H04W 4/027 |
| | | | 455/411 |
| 2015/0205379 A1* | 7/2015 | Mag | G06F 1/1694 |
| | | | 345/156 |
| 2015/0301581 A1* | 10/2015 | Ding | G06F 1/3275 |
| | | | 713/320 |
| 2015/0324685 A1* | 11/2015 | Bohn | G06N 3/04 |
| | | | 706/15 |
| 2016/0091955 A1* | 3/2016 | Black | G06F 1/3243 |
| | | | 702/189 |
| 2016/0162004 A1* | 6/2016 | Ljubuncic | G06F 9/5083 |
| | | | 713/320 |
| 2016/0179714 A1* | 6/2016 | Acharya | G06F 12/023 |
| | | | 711/158 |
| 2016/0217091 A1* | 7/2016 | Murakami | G06F 13/4068 |
| 2016/0255014 A1* | 9/2016 | Shmidt | G06F 1/3209 |
| | | | 709/226 |
| 2016/0283284 A1* | 9/2016 | Sun | G06F 1/329 |
| 2016/0344937 A1* | 11/2016 | Iwashita | H04N 23/80 |
| 2017/0103586 A1* | 4/2017 | Hasenfratz | G07C 5/008 |
| 2017/0109568 A1* | 4/2017 | Escalier | G06V 40/165 |
| 2017/0158197 A1 | 6/2017 | Johnson et al. | |
| 2017/0178681 A1* | 6/2017 | Keal | G10L 15/285 |
| 2017/0250981 A1* | 8/2017 | Denton | G06F 21/77 |
| 2017/0308594 A1* | 10/2017 | Hong | G16B 40/00 |
| 2017/0317946 A1* | 11/2017 | Ji | G06F 15/16 |
| 2017/0371394 A1* | 12/2017 | Chan | G06F 1/3218 |
| 2018/0039519 A1* | 2/2018 | Kumar | G06F 9/4812 |
| 2018/0096212 A1* | 4/2018 | Lin | G06V 40/168 |
| 2018/0285151 A1* | 10/2018 | Wang | G06F 9/5083 |
| 2018/0349205 A1 | 12/2018 | Kolluru et al. | |
| 2018/0356994 A1* | 12/2018 | Berke | G06F 3/0658 |
| 2018/0357190 A1* | 12/2018 | Han | G09B 29/106 |
| 2019/0050231 A1* | 2/2019 | Lysaght | G06F 9/3877 |
| 2019/0248019 A1* | 8/2019 | Nelson | G10L 15/222 |
| 2020/0150648 A1 | 5/2020 | Horita et al. | |
| 2020/0372779 A1* | 11/2020 | Moriya | G08B 21/0476 |

FOREIGN PATENT DOCUMENTS

| | | |
|---|---|---|
| CN | 104320433 A | 1/2015 |
| CN | 107131908 A | 9/2017 |
| CN | 108430833 A | 8/2018 |
| CN | 108819881 A | 11/2018 |
| JP | 2005208919 A | 8/2005 |
| WO | 2019021668 A1 | 1/2019 |

OTHER PUBLICATIONS

International Search Report and Written Opinion issued in PCT/CN2020/074303, dated May 9, 2020, 9 pages.
Office Action issued in JP2021-547517, dated Sep. 20, 2022, 7 pages.
Dejan Milojicic et al.: "Process Migration", Feb. 1, 1999, total 49 pages.
Gharapetian VD et al: "An object-oriented data fusion system for mobile vehicle", Systems, Man and Cybernetics, 1995. Intelligent Systems for the 21st Century, IEEE International Conference on Vancouver, BC, Canada Oct. 22-25, 1995, vol. 2, Oct. 22, 1995, total 6 pages.
Extended European Search Report issued in EP20755640.8, dated Feb. 10, 2022, 8 pages.
Office Action issued in JP2021-547517, dated Feb. 20, 2023, 9 pages.

* cited by examiner

DATA PROCESSING METHOD AND CORRESPONDING APPARATUS BASED ON STATUS INFORMATION OF PROCESSORS

CROSS-REFERENCE TO RELATED APPLICATIONS

This application is a continuation of International Application No. PCT/CN2020/074303, filed on Feb. 5, 2020, which claims priority to Chinese Patent Application No. 201910114432.8, filed on Feb. 14, 2019. The disclosures of the aforementioned applications are hereby incorporated by reference in their entireties.

TECHNICAL FIELD

Embodiments of this application relate to the field of information processing technologies, and in particular, to a data processing method and a corresponding apparatus.

BACKGROUND

Automated driving, also referred to as self-driving, is to sense a surrounding environment of a vehicle, a vessel, an airplane, or the like through a sensing system, and control steering and a speed of the vehicle, the vessel, the airplane, or the like based on information obtained through sensing, such as a road, a shipping route, or a flight path, and a location and an obstacle of the vehicle, the vessel, the airplane, or the like, to implement safe and reliable driving of the vehicle, the vessel, the airplane, or the like. Currently, with development of technologies such as artificial intelligence and the automated driving, safety and reliability of the automated driving are being gradually improved.

With an increasing degree of automated driving for vehicles, the vehicles, vessels, airplanes, or the like generate more massive data. To achieve reliability and timeliness of control and decision-making with the massive data, a computing architecture with a high computing capacity and high reliability is required for implementation of automated driving. In existing solutions, there are two typical computing architectures: a centralized architecture and a decentralized architecture. FIG. 1 and FIG. 2 are schematic diagrams of two typical data processing architectures in the prior art. FIG. 1 shows a decentralized data processing architecture in the prior art. In the decentralized architecture, terminal sensors perform abstract processing on raw data to obtain object data or metadata (meta data, which is data that describes data attributes), and transmit the object data or the metadata to a central processing unit. The central processing unit integrates the object data or the metadata transmitted by the terminal sensors to make a decision. However, a processor needs to be disposed on the terminal sensor in the decentralized architecture, resulting in a large size, higher costs, and larger power consumption of the terminal sensor, and imposing higher requirements for functions and safety. In addition, because the central processing unit obtains the object data or the metadata other than actual sensor data, a specific field of interest cannot be tracked. FIG. 2 shows a centralized data processing architecture in the prior art. In the centralized architecture, terminal sensors transmit raw data to a central processing unit, and the central processing unit implements all raw data processing and decision-making. However, upon receiving massive data transmitted by the terminal sensors, the central processing unit needs to process the massive data in a timely manner. Such highly intensive computing leads to huge load for the central processing unit, and data transmission of up to several GB per second causes relatively large electromagnetic interference.

SUMMARY

Embodiments of this application provide a data processing method, to resolve problems such as high costs and high function requirements, or overload and frequent system breakdown caused by massive data processing tasks in an existing data processing architecture.

To achieve the foregoing objective, the following technical solutions are used in the embodiments of this application.

According to a first aspect, a data processing method is provided, and the method is applied to a data processing apparatus. The data processing apparatus may include a central processing unit and a sensor processing unit set, and the sensor processing unit set includes at least one sensor processing unit. The method may include: obtaining, by the central processing unit, status information of the at least one sensor processing unit in the sensor processing unit set; determining, by the central processing unit, task switching information based on the status information of the at least one sensor processing unit and/or status information of the central processing unit, where the task switching information is used to indicate to switch a data processing task of a first sensor processing unit to the central processing unit, or switch a data processing task of the central processing unit to a second sensor processing unit; and the first sensor processing unit and the second sensor processing unit each is any sensor processing unit in the sensor processing unit set; and processing, by the central processing unit, the data processing task switched from the first sensor processing unit to the central processing unit, and/or processing, by the second sensor processing unit, the data processing task switched from the central processing unit to the second sensor processing unit.

In the technical solution provided in the first aspect, switching of the data processing task is triggered and performed based on the status information of the sensor processing unit and/or the central processing unit. In this way, with reference to characteristics of a decentralized structure and a centralized architecture, data processing tasks may be allocated based on an actual status such as load, hardware, or software of the sensor processing unit and/or the central processing unit, to ensure stable load for the data processing apparatus and ensure reliable execution of the data processing task.

In a possible implementation, the status information may include capability information and/or load information; and the task switching information may include: switching a data processing task from a sensor processing unit to the central processing unit, or switching the data processing task from the central processing unit to a sensor processing unit. The determining, by the central processing unit, task switching information based on the status information of the at least one sensor processing unit and/or status information of the central processing unit may include: if it is satisfied that load information of the central processing unit indicates that load of the central processing unit is greater than a load threshold of the central processing unit, and status information of the second sensor processing unit indicates that the second sensor processing unit is capable of processing the data processing task of the central processing unit, the task switching information is for switching from the central processing unit to the second sensor processing unit, and is used to indicate to switch the data processing task from the central processing unit to the second sensor processing unit; or if it is satisfied that status information of the first sensor processing unit indicates that the first sensor processing unit is incapable of processing the data processing task of the first sensor processing unit, the task switching information is for switching from the first sensor processing unit to the central processing unit, and is used to indicate to switch the data processing task from the first sensor processing unit to the central processing unit. A switching decision is made based on the capability information, the load information, and a preset condition to perform data processing task switching, to ensure stable load for the data processing apparatus and ensure reliable execution of the data processing task.

In a possible implementation, the data processing task may include at least one of: data abstraction, data fusion, or behavior decision-making. Task switching based on a requirement is supported during execution of any data processing task, to better ensure stable load for the data processing apparatus and reliable execution of the data processing task.

In a possible implementation, the obtaining, by the central processing unit, status information of the at least one sensor processing unit in the sensor processing unit set may include: before the at least one sensor processing unit in the sensor processing unit set starts performing data abstraction, obtaining, by the central processing unit, status information of at least one sensor; before the central processing unit starts performing data abstraction, obtaining, by the central processing unit, the status information of the at least one sensor processing unit; before the central processing unit starts performing data fusion, obtaining, by the central processing unit, the status information of the at least one sensor processing unit; before the central processing unit starts performing behavior decision-making, obtaining, by the central processing unit, the status information of the at least one sensor processing unit; or before the at least one sensor processing unit in the sensor processing unit set starts performing behavior decision-making, obtaining, by the central processing unit, the status information of the at least one sensor processing unit. Task switching based on a requirement is supported before any data processing task starts, to better ensure stable load for the data processing apparatus and reliable execution of a to-be-processed data processing task.

In a possible implementation, if before the first sensor processing unit starts performing data abstraction, the task switching information is for switching the data processing task from the sensor processing unit to the central processing unit, or if before the first sensor processing unit starts performing behavior decision-making, the task switching information is for switching the data processing task from the sensor processing unit to the central processing unit, the processing, by the central processing unit, the data processing task switched from the first sensor processing unit to the central processing unit may include: stopping, by the first sensor processing unit, a data abstraction task, and switching the data abstraction task to the central processing unit; and performing, by the central processing unit, data abstraction to obtain abstract data; or stopping, by the first sensor processing unit, a behavior decision-making task, and switching the behavior decision-making task to the central processing unit; and performing, by the central processing unit, behavior decision-making. Task switching based on a requirement is supported before any data processing task starts, to better ensure stable load for the data processing apparatus and reliable execution of a to-be-processed data processing task.

In a possible implementation, if before the central processing unit starts performing data abstraction, the task switching information is for switching the data processing task from the central processing unit to the sensor processing unit, or if before the central processing unit starts performing data fusion, the task switching information is for switching the data processing task from the central processing unit to the sensor processing unit, the processing, by the second sensor processing unit, the data processing task switched from the central processing unit to the second sensor processing unit may include: stopping, by the central processing unit, a data abstraction task, and switching the data abstraction task to the second sensor processing unit; and performing, by the second sensor processing unit, data abstraction to obtain abstract data; or stopping, by the central processing unit, a data fusion task, and switching the data fusion task to the second sensor processing unit; and performing, by the second sensor processing unit, behavior decision-making. Task switching based on a requirement is supported before any data processing task starts, to better ensure stable load for the data processing apparatus and reliable execution of a to-be-processed data processing task.

In a possible implementation, the data abstraction may include: determining, based on initial data, N characteristic points corresponding to the initial data; determining, based on the initial data, N characteristic points corresponding to an initial signal; determining M characteristic faces based on the N characteristic points; and determining L target objects based on the M characteristic faces.

In a possible implementation, each sensor processing unit communicates with the central processing unit through the Ethernet. Communication through the Ethernet can ensure real-time transmission of the status information and the task switching information, thereby improving timeliness and accuracy of the switching process.

In a possible implementation, if before the central processing unit starts performing data fusion, the load information of the central processing unit indicates that the load of the central processing unit is less than the load threshold of the central processing unit, the central processing unit performs data fusion to obtain fused data; and the fused data may include at least one of: spatial location information and a speed of each characteristic point or each target object; an attribute of each characteristic point or each target object; or current environment information. Abstract data corresponding to the at least one sensor processing unit is fused to synthesize an analysis result corresponding to each sensor processing units, thereby improving reliability of behavior decision-making.

In a possible implementation, after the processing, by the central processing unit, the data processing task switched from the first sensor processing unit to the central processing unit, and/or processing, by the second sensor processing unit, the data processing task switched from the central processing unit to the second sensor processing unit, the method may further include: obtaining control information, where the control information includes acceleration, deceleration, stopping, turning right, turning left, or turning around. Switching is performed based on a requirement to complete the data processing tasks and obtain the control information, to ensure stable load for the data processing apparatus and normal generation of the control information.

According to a second aspect, a data processing apparatus is provided, and the data processing apparatus can implement the methods and the functions according to any one of the possible implementations of the first aspect. The functions may be implemented by hardware, or may be implemented by executing corresponding software by hardware. The hardware or software includes one or more modules corresponding to the foregoing functions.

This application provides a data processing apparatus, and the data processing apparatus may include: a memory, configured to store a computer-executable instruction; and a processor, configured to execute the computer-executable instruction to implement the data processing method according to any one of the possible implementations of the first aspect.

This application provides a computer-readable storage medium, where the computer-readable storage medium stores a computer-executable instruction, and when the computer-executable instruction is executed by a processor, the data processing method according to any one of the possible implementations of the first aspect is implemented.

DESCRIPTION OF EMBODIMENTS

The embodiments of this application provide a data processing method. A data processing apparatus in the method may be an apparatus installed on devices such as a vehicle, a vessel, an airplane, a drone, and a robot. The data processing apparatus may include a central processing unit and several sensor processing units. The data processing apparatus may also include several central processing units. Correspondingly, each central processing unit and several sensor processing units form a set. Sets corresponding to the central processing units may be independent of each other, or may support data sharing, fusion, or comprehensive decision-making. This is not limited in the embodiments of this application.

Figure 1:
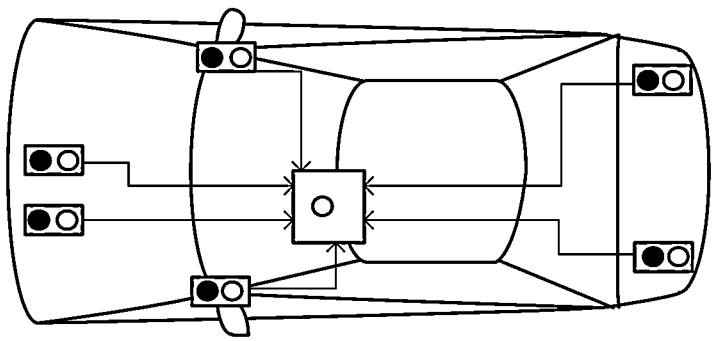
FIG. 1 is a schematic diagram of a decentralized data processing architecture in the prior art.
Figure 2:
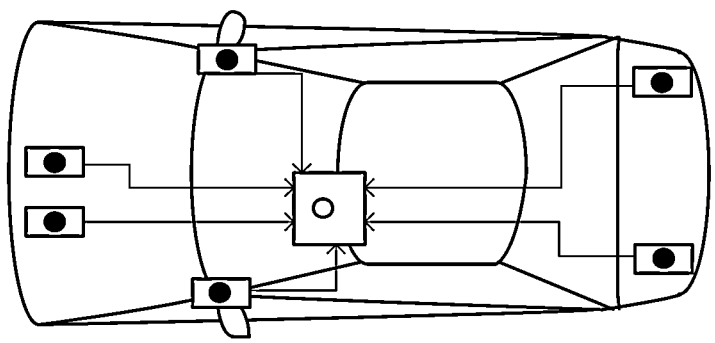
FIG. 2 is a schematic diagram of a centralized data processing architecture in the prior art.
Figure 3:
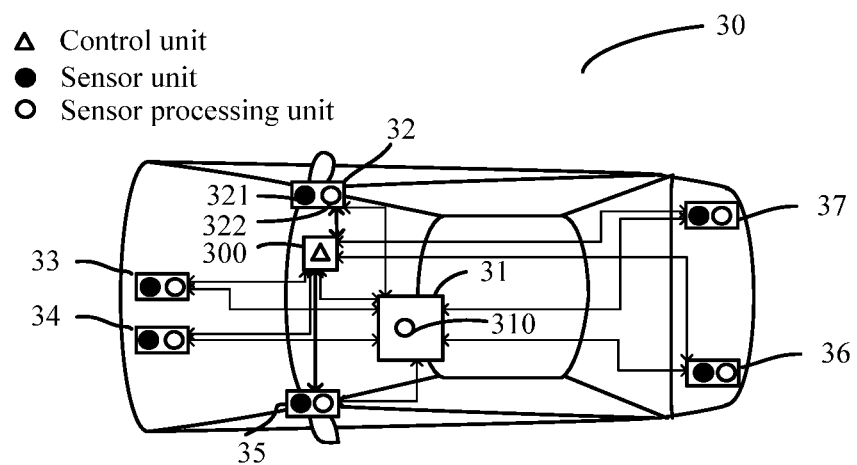
FIG. 3 is a schematic diagram of a data processing architecture of a data processing method according to an embodiment of this application.

A vehicle-mounted data processing apparatus is used as an example. FIG. 3 is a schematic diagram of a data processing architecture of a data processing method according to an embodiment of this application. A data processing apparatus 30 is installed on a vehicle. The data processing apparatus 30 includes one central processing module 31 and six sensor processing modules: a sensor processing module 32, a sensor processing module 33, a sensor processing module 34, a sensor processing module 35, a sensor processing module 36, and a sensor processing module 37. As shown in FIG. 3, the central processing module 31 and the sensor processing modules 32 to 37 are separately installed on different parts of a vehicle 3, such as a rearview mirror, a main console, the rear of the vehicle, and the front of the vehicle. The central processing module 31 includes a central processing unit 310, and each sensor processing module includes a sensor unit and a sensor processing unit. The sensor processing module 32 is used as an example. The sensor processing module 32 includes a sensor unit 321 and a sensor processing unit 322.

The following explains data processing terms possibly used in the embodiments of this application.

Analog signal: a signal obtained by converting, according to a specific rule, physical information collected by the sensor unit. Specifically, in this disclosure, an electrical signal mentioned below is an analog signal.

Digital signal: a signal obtained through digital signal processing on an analog signal.

Characteristic data: data obtained through characteristic identification on a signal.

Target data: data obtained through characteristic identification and target identification on a digital signal.

The following describes the data processing method by using the sensor processing module 32 as an example.

The sensor unit 321 may include at least one of a camera apparatus, millimeter wave radar, laser radar, ultrasonic radar, GPS, inertial navigation, or the like. The sensor unit 321 may also include a high-definition map and conventional vehicle-mounted sensors such as a thermal sensor, an optical sensor, a gas sensor, a force sensor, a magnetic sensor, a moisture sensor, a temperature sensor, a distance sensor, a pressure sensor, an acceleration sensor, a sound sensor, a radiation sensor, a color sensor, and a taste sensor. The sensor unit 321 is configured to: when the vehicle is driving or stops, collect target physical information and various other physical information such as light, electricity, sound, and heat, and convert, according to a specific rule, the collected physical information into an electrical signal or another required signal form for output, and transmit the signal to the sensor processing unit 322. The sensor processing unit 322 converts the electrical signal or the another signal form into a digital signal through digital signal processing.

It should be noted that the sensor unit 321 may also be replaced with another information collection unit, such as a camera or millimeter wave radar. This is not limited in embodiments of this application.

The sensor processing unit 322 may transmit an initial signal to the central processing unit 310, and the central processing unit 310 performs data abstraction processing.

In some embodiments of this application, the sensor processing unit 322 may also perform characteristic point identification, characteristic face identification, or target identification based on the initial signal, to obtain abstract data (first abstract data), and transmit the abstract data to the central processing unit 310. The initial data is a relative concept, and may be a digital signal or characteristic data.

The abstract data may be characteristic data or target data. If characteristic point or face identification is performed on the initial signal, the abstract data is the characteristic data, and in this case, the initial data is the digital signal. If characteristic identification and target identification are performed on the initial signal, the abstract data is the target data and in this case, the initial data is the digital signal and the characteristic data. Optionally, the sensor processing unit 322 may alternatively transmit the initial signal to the central processing unit 310 at the same time.

A process of another sensor processing module is similar to the foregoing process.

The central processing unit 310 may perform data fusion on abstract data transmitted by the sensor processing units to obtain the fused data, and then perform further behavior decision-making based on the fused data.

In some embodiments of this application, when load, hardware, software, or the like of the central processing unit 310 allows, the central processing unit 310 may perform data abstraction processing on initial signals transmitted by the sensor processing units, to obtain second abstract data, and perform deterministic checking based on the second abstract data and first abstract data obtained from the sensor processing units, to obtain the abstract data corresponding to the sensor processing units, and then perform data fusion processing on the abstract data corresponding to the sensor processing units to obtain the fused data, and perform further behavior decision-making based on the fused data.

In some embodiments of this application, when status information of the central processing unit 310 indicates that the central processing unit 310 is incapable of completing the data fusion processing, the central processing unit 310 may switch a data processing task of the central processing unit 310 to a sensor processing unit capable of completing the data processing task, and the sensor processing unit performs behavior decision-making based on abstract data.

In some embodiments of this application, the vehicle may further include a control unit 300, configured to control the vehicle based on control information after the central processing unit 310 completes behavior decision-making or the sensor processing unit 322 completes behavior decision-making based on the first abstract data or the second abstract data, and after the central processing unit 310 or the sensor processing unit 322 may generate the control information based on a result of the behavior decision-making.

In some embodiments of this application, the sensor processing unit 322 may alternatively first perform other processing based on the abstract data, for example, the sensor processing unit 322 synthesizes and analyzes abstract data corresponding to other sensors; and then performs behavior decision-making. This is not limited in this embodiment of this application.

Figure 4A:
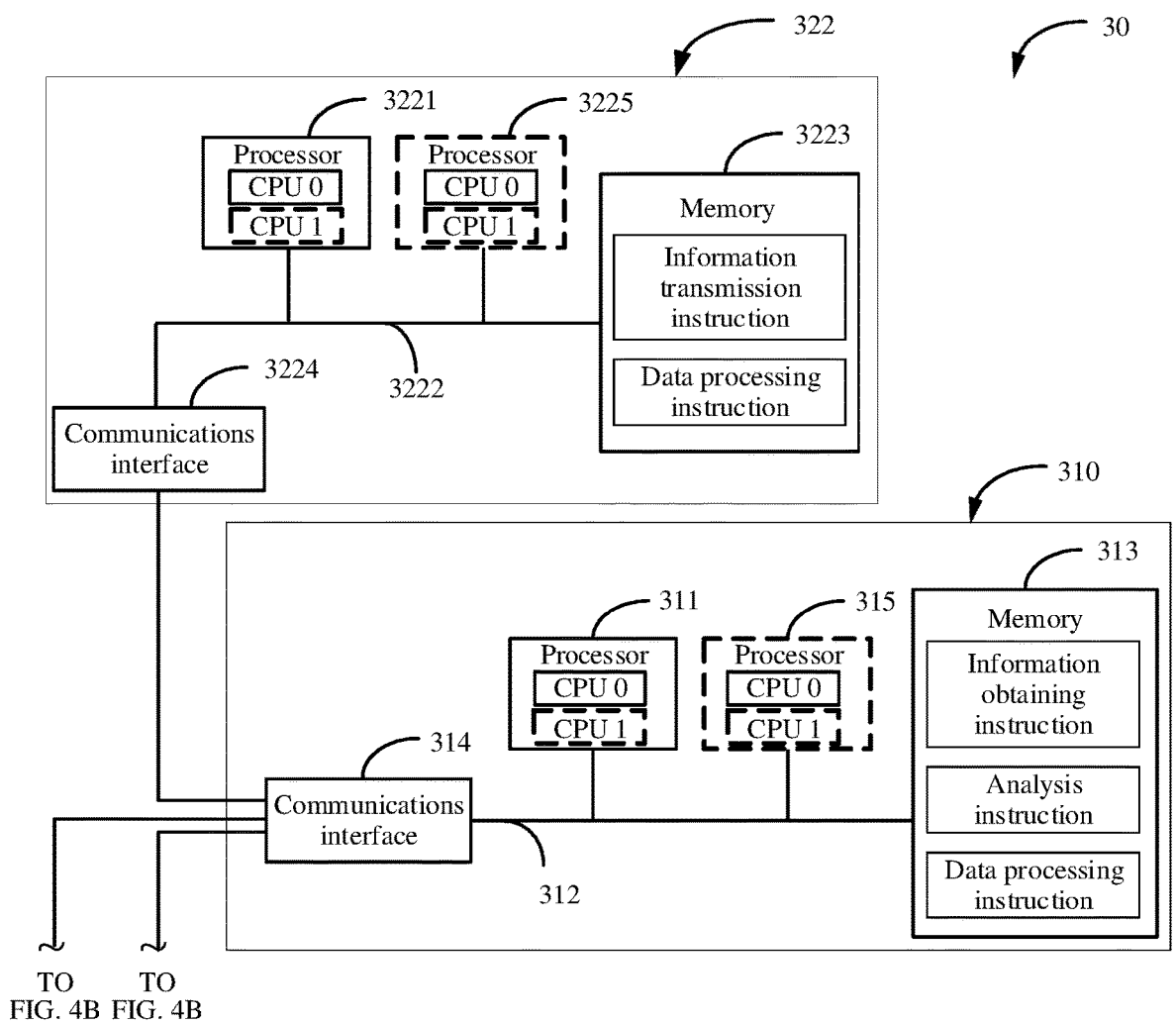
FIG. 4A and FIG. 4B are schematic diagrams of a hardware structure of a data processing apparatus according to an embodiment of this application.
Figure 4B:
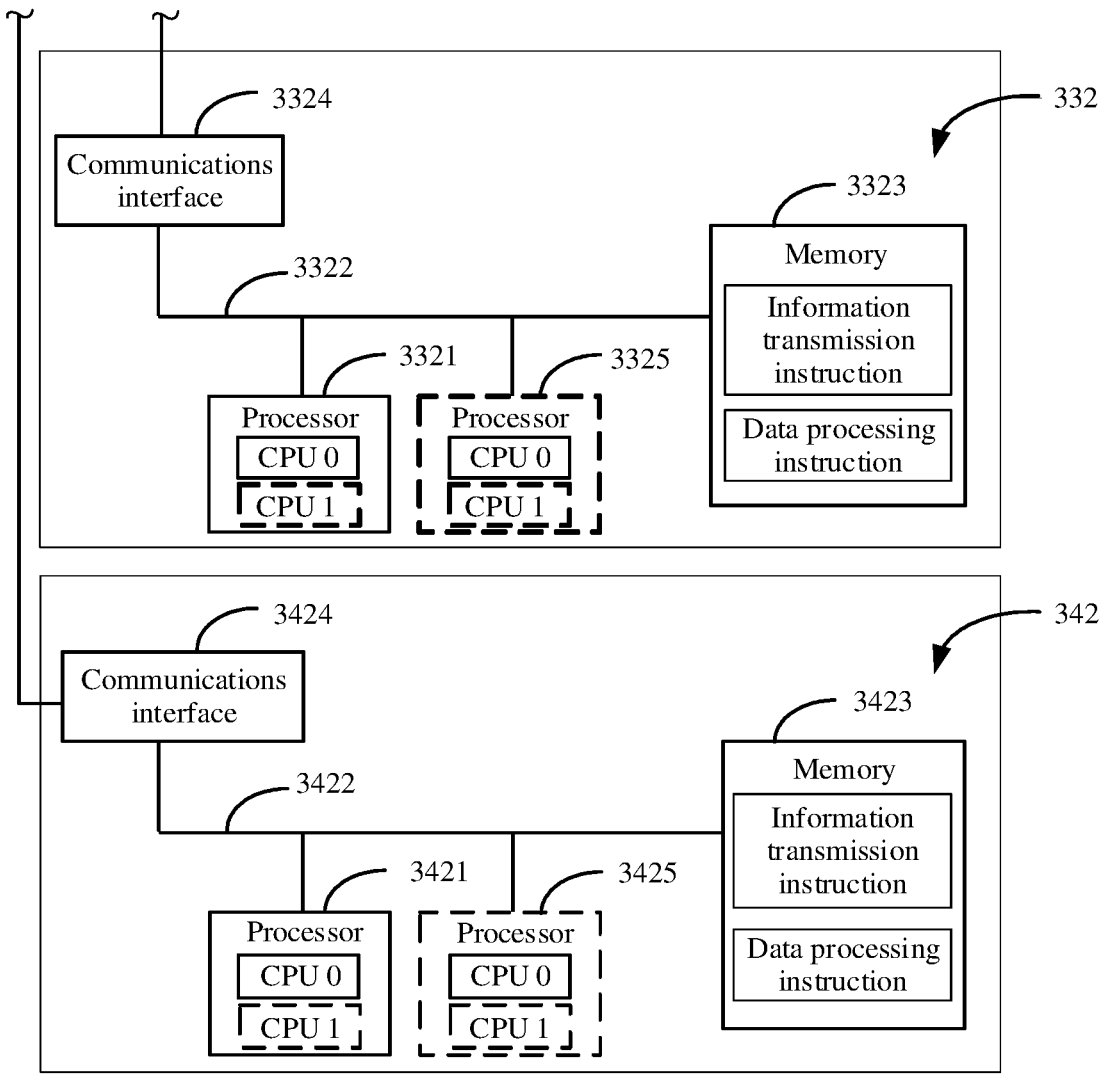

FIG. 4A and FIG. 4B are schematic diagrams of a hardware structure of a data processing apparatus according to an embodiment of this application. The data processing apparatus 30 includes a central processing module 31, a sensor processing module 32, a sensor processing module 33, and a sensor processing module 34. As shown in FIG. 4A and FIG. 4B, the central processing module 31 includes a central processing unit 310, the sensor processing module 32 includes a sensor processing unit 322, the sensor processing module 33 includes a sensor processing unit 332, and the sensor processing module 34 includes a sensor processing unit 342. The sensor processing unit 322, the sensor processing unit 332, the sensor processing unit 342, and the central processing unit 310 each include a processor, a communications line, a memory, and at least one communications interface (an example in which a communications interface is included is used for description in FIG. 4A and FIG. 4B).

The following uses the central processing unit 310 as an example for detailed description. The central processing unit 310 includes a processor 311, a communications line 312, a memory 313, and at least one communications interface.

The processor 311 may be a general-purpose central processing unit (CPU), a microprocessor, an application-specific integrated circuit (ASIC), or one or more integrated circuits configured to control program execution for the solution of this application.

The communications line 312 may include a path for transmitting information between the foregoing components.

The communications interface 314 uses any apparatus such as a transceiver to communicate with another device or a communications network, such as the Ethernet, a radio access network (RAN), or a wireless local area network (WLAN).

The memory 313 may be a read-only memory (ROM), another type of static storage device that can store static information and instructions, a random access memory (RAM), or another type of dynamic storage device that can store information and instructions; or may be an electrically erasable programmable read-only memory (EEPROM), a compact disc read-only memory (CD-ROM), or another optical disk storage, an optical disc storage (including a compact optical disc, a laser disc, an optical disc, a digital versatile disc, a Blu-ray disc, or the like), a magnetic disk storage medium or other magnetic storage devices, or any other medium that can be configured to carry or store expected program code in a form of one or more instructions or one or more data structures and that is accessible to a computer. However, this does not constitute any limitation. The memory may exist independently and is connected to the processor by using the communications line 312. The memory may also be integrated with the processor.

The memory 313 is configured to store one or more computer-executable instructions for performing the solutions in this application. The memory 313 can store instructions for implementing three modular functions: an information obtaining instruction, an analysis instruction, and a data processing instruction, and the processor 311 controls execution of the instructions. The processor 311 is configured to execute the computer-executable instructions stored in the memory 313, to implement a data processing method provided in the following embodiments of this application. FIG. 4A and FIG. 4B are merely schematic diagrams of the memory 313, and the memory may also include other functional instructions. This is not limited in embodiments of the present invention.

Optionally, the computer-executable instructions in this embodiment of this application may also be referred to as application program code. This is not specifically limited in embodiments of this application.

In specific implementation, in an embodiment, the processor 311 may include one or more CPUs, for example, a CPU 0 and a CPU 1 in the central processing unit 310 in FIG. 4A and FIG. 4B.

In specific implementation, in an embodiment, the central processing unit 310 may include a plurality of processors, for example, the processor 311 and a processor 315 in FIG. 4A and FIG. 4B. Each of these processors may be a single-core (single-CPU) processor, or may be a multi-core (multi-CPU) processor. The processor herein may be one or more devices, circuits, and/or processing cores used to process data (such as a computer program instruction).

Similarly, hardware structures of the sensor processing unit 322, the sensor processing unit 332, and the sensor processing unit 342 are the same as a hardware structure of the central processing unit 310. To be specific, the sensor processing unit 322 includes a processor 3221, a processor 3225, a communications line 3222, a memory 3223, and at least one communications interface. The sensor processing unit 332 includes a processor 3321, a processor 3325, a communications line 3322, a memory 3323, and at least one communications interface. The sensor processing unit 342 includes a processor 3421, a processor 3425, a communications line 3422, a memory 3423, and at least one communications interface. The sensor processing unit 322, the sensor processing unit 332, and the sensor processing unit 342 are separately connected to the central processing unit 310 through the communications interfaces. The memory 3223, the memory 3323, and the memory 3423 may store instructions used to implement two modular functions: an information transmission instruction and a data processing instruction.

It should be noted that FIG. 3, FIG. 4A, and FIG. 4B are merely an example, and neither impose any limitation on a quantity of sensor processing modules in the data processing apparatus 30 nor impose any limitation on a location relationship between the central processing module and the sensor processing modules.

With reference to FIG. 3, FIG. 4A, and FIG. 4B, the following describes in detail the data processing method according to the embodiments of this application. A basic principle of the method is as follows: Switching decision-making is performed based on the status information of sensor processing unit and/or the central processing unit, to trigger and perform switching of the data processing task, so that data processing tasks are allocated based on an actual status such as load, hardware, or software of the sensor processing unit and/or the central processing unit. This ensures stable load for the data processing apparatus and ensures normal execution of the data processing task.

Figure 5:
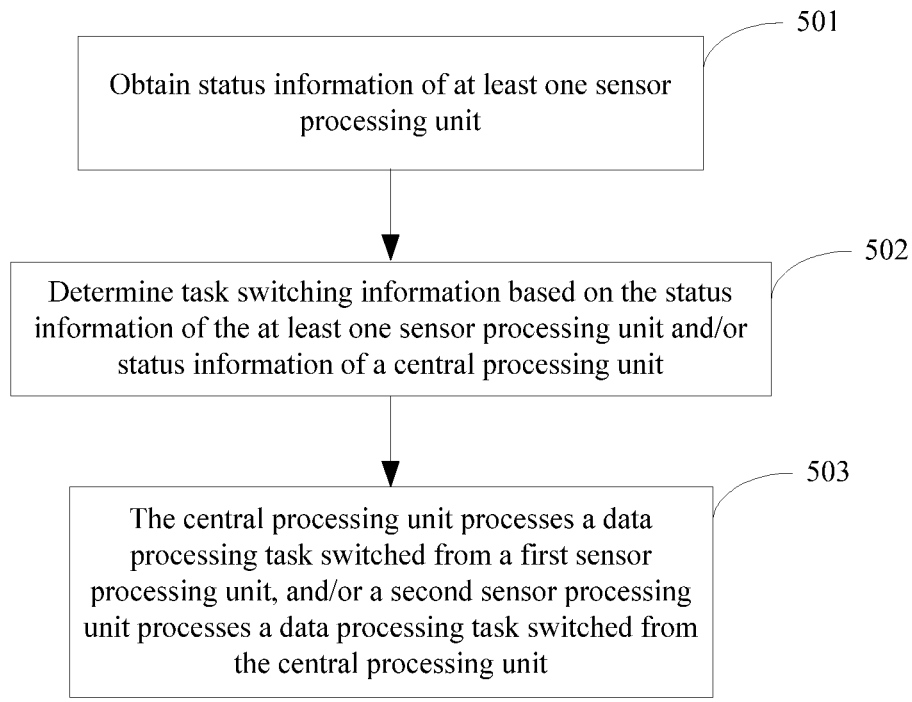
FIG. 5 is a flowchart of a data processing method according to an embodiment of this application.

FIG. 5 is a flowchart of a data processing method according to an embodiment of this application. The method is applied to a data processing apparatus 30. The data processing apparatus 30 may include a central processing unit 310 and a sensor processing unit set. The sensor processing unit set includes a sensor processing unit 322, a sensor processing unit 332, and a sensor processing unit 342. The method may include the following steps 501 to 503.

501. A processor 311 of the central processing unit 310 executes one or more information obtaining instructions in a memory 313, to obtain status information of at least one sensor processing unit in the sensor processing unit set.

The central processing unit 310 may communicate with the at least one sensor processing unit through a communications network to obtain status information of the at least one sensor processing unit, such as the Ethernet, a radio access network (RAN), or a wireless local area network (WLAN).

The status information may be about hardware or software, or may be about load or other status information. This is not limited in embodiments of this application.

It should be noted that the central processing unit 310 may obtain status information of at least one of the sensor processing unit 322, the sensor processing unit 332, and the sensor processing unit 342 before needing to start a specific data processing task, or obtain the status information of the at least one sensor processing unit in a process of performing a specific data processing task. This is not limited in embodiments of this application.

Further, the data processing task may include at least one of: data abstraction, data fusion, or behavior decision-making.

Further, the data abstraction may include: determining, based on initial data, N characteristic points corresponding to the initial data; determining, based on the initial data, N characteristic points corresponding to an initial signal; determining M characteristic faces based on the N characteristic points; and determining L target objects based on the M characteristic faces.

It should be noted that, at a specific moment, the central processing unit 310 is concurrently processing data processing tasks (data abstraction, data fusion, or behavior decision-making) corresponding to several sensor processing units, and in this case, the central processing unit 310 may simultaneously obtain the status information of the sensor processing unit 321, the sensor processing unit 322, and the sensor processing unit 323, or obtain the status information of the foregoing three sensor processing units in a specific time sequence, or may obtain the status information of the at least one sensor processing unit based on an actual status. This is not limited in embodiments of this application.

Figure 6:
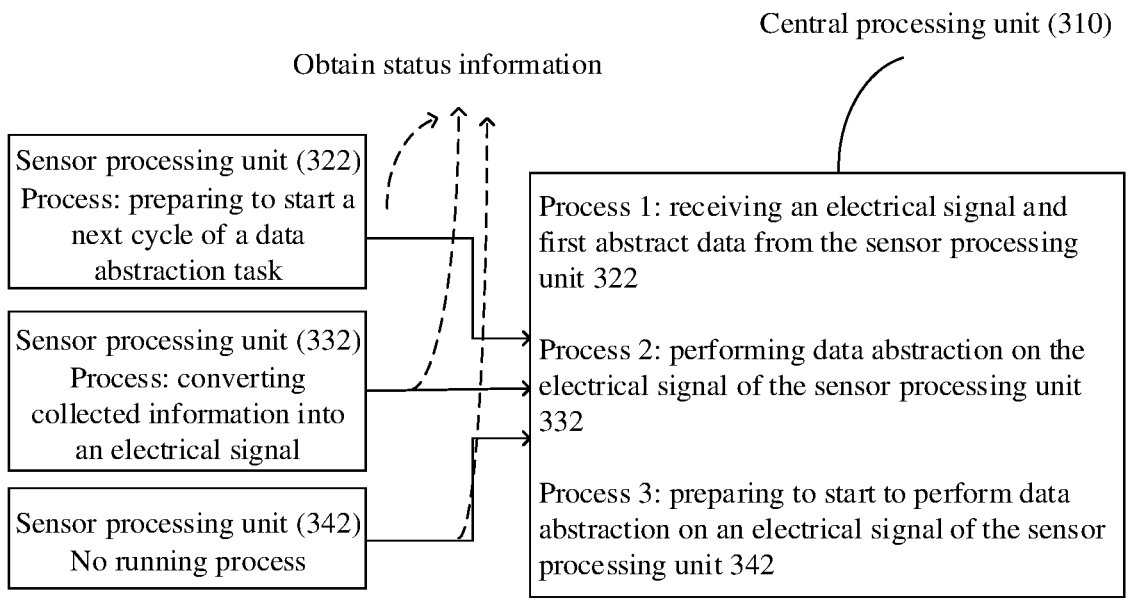
FIG. 6 is an example diagram 1 of obtaining status information according to an embodiment of this application.

For example, FIG. 6 is an example diagram 1 of obtaining status information according to an embodiment of this application. At a specific moment, as shown in FIG. 6, the central processing unit 310 has three processing processes. A process 1 is receiving an initial signal and first abstract data from the sensor processing unit 322, a process 2 is performing the data abstraction on an initial signal of the sensor processing unit 332, and a process 3 is preparing to start to perform data abstraction processing on an initial signal of the sensor processing unit 342. The sensor processing unit 322 is preparing for a next cycle of a data abstraction task. The sensor processing unit 332 is converting, into an initial signal, information collected by a sensor unit. The sensor processing unit 342 is in an idle state. At this moment, the central processing unit 310 obtains the status information of the sensor processing unit 322, the sensor processing unit 332, and the sensor processing unit 342 at the same time or in a specific sequence.

Figure 7:
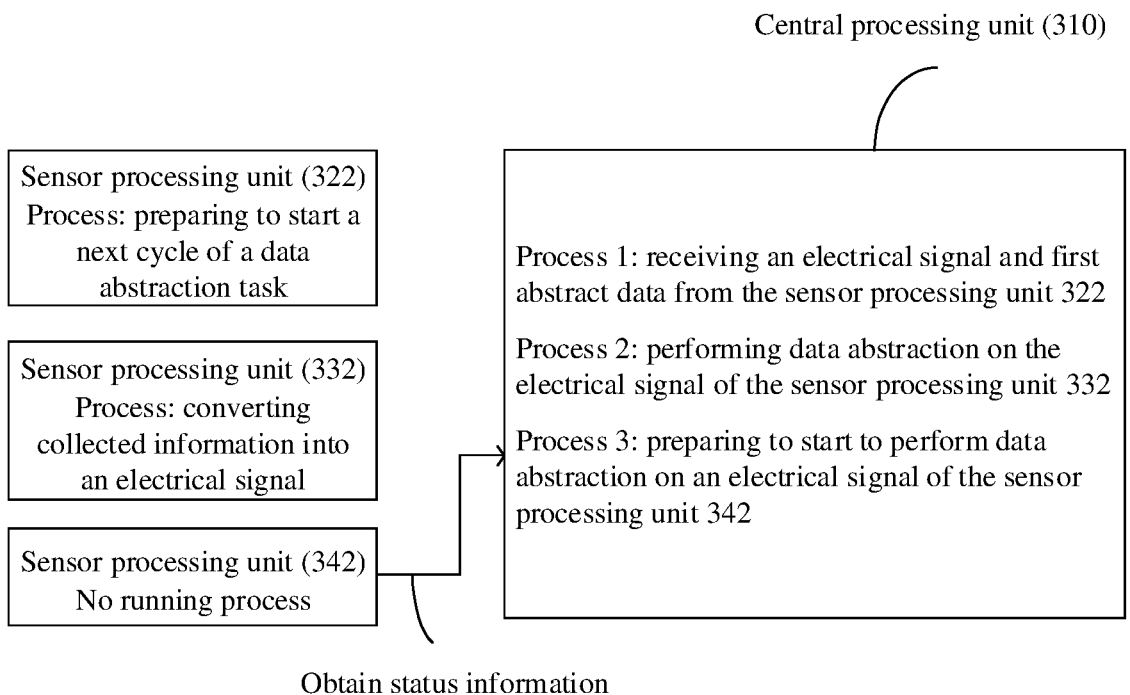
FIG. 7 is an example diagram 2 of obtaining status information according to an embodiment of this application.

Optionally, at this moment, the central processing unit 310 may alternatively obtain only the status information of the sensor processing unit 342. For example, before starting data abstraction on the initial signal of the sensor processing unit 342, the central processing unit 310 determines whether to switch the data abstraction task back to the sensor processing unit 342. FIG. 7 is an example diagram 2 of obtaining status information according to an embodiment of this application.

502. The processor 311 of the central processing unit 310 executes an analysis instruction in the memory 313, to determine task switching information based on the status information of the at least one sensor processing unit and/or status information of the central processing unit 310, where the task switching information is used to indicate to switch a data processing task of a first sensor processing unit to the central processing unit 310, or switch a data processing task of the central processing unit 310 to a second sensor processing unit; and the first sensor processing unit and the second sensor processing unit each is any sensor processing unit in the sensor processing unit set.

Specifically, the central processing unit 310 may analyze the status information of the sensor processing unit that is obtained by the central processing unit 310 and/or the status information of the central processing unit 310, and when the central processing unit 310 is incapable of completing a specific data processing task, the data processing task is switched from the central processing unit 310 to a specific sensor processing unit for implementation, or when a specific sensor processing unit is incapable of completing a specific data processing task, the data processing task is switched from the sensor processing unit to the central processing unit 310 for implementation.

In another possible implementation, if the central processing unit 310 does not receive, within a preset time, the status information transmitted by the sensor processing unit, the central processing unit 310 may consider the sensor processing unit to be faulty, and starts switching of the data processing task. Alternatively, if the sensor processing unit does not receive any information from the central processing unit 310 within the preset time, the sensor processing unit may consider the central processing unit 31 to be faulty, and independently completes the data processing task corresponding to the sensor processing unit before the central processing unit 310 recovers.

503. The processor 311 of the central processing unit 310 executes a data processing instruction in the memory 313, to process the data processing task switched from the first sensor processing unit to the central processing unit 310, and/or a processor 3221 of a second sensor processing unit 322 executes a data processing instruction in a memory 3223, to process the data processing task switched from the central processing unit 310 to the second sensor processing unit.

Herein, an example in which the second sensor processing unit is the sensor processing unit 322 is used for description. Actually, the second sensor processing unit may be any sensor processing unit, satisfying a condition, in the sensor processing unit set.

Optionally, the status information may include capability information and/or load information. The capability information may be a hardware capability (for example, indicating whether the hardware is faulty or whether there is an alarm), a software capability, or a computing capacity, or may be another related capability that affects data processing. This is not limited in embodiments of this application.

Optionally, the task switching information may include: switching a data processing task from a sensor processing unit to the central processing unit, or switching the data processing task from the central processing unit to a sensor processing unit.

Figure 8:
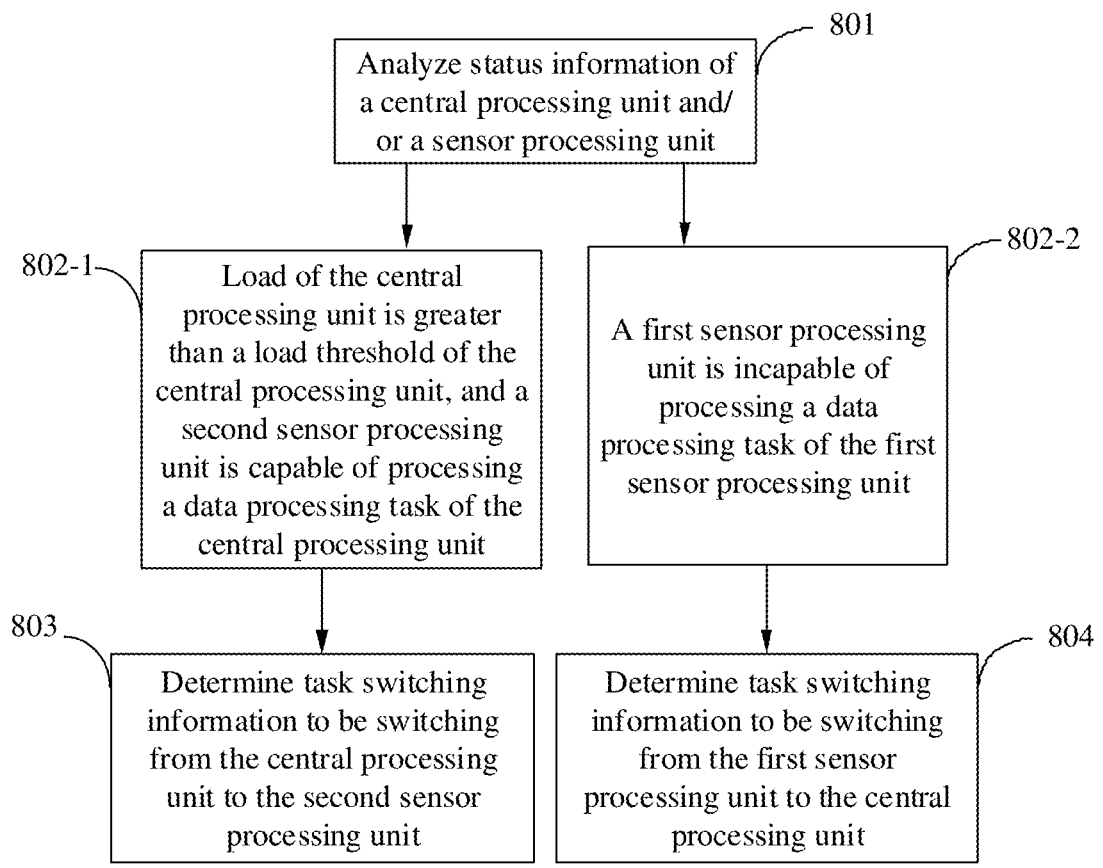
FIG. 8 is a flowchart of a method for determining task switching information according to an embodiment of this application.

Further, as shown in FIG. 8, step 502 in which the central processing unit 310 determines the task switching information based on the status information of the at least one sensor processing unit and/or the status information of the central processing unit may include the following step:

801. The processor 311 of the central processing unit 310 executes the analysis instruction in the memory 313, to analyze status information of the central processing unit 310, the first sensor processing unit, and/or the second sensor processing unit.

In a possible implementation, the central processing unit 310 may analyze whether hardware, software, or the like of the central processing unit 310 and/or the sensor processing unit operates normally and whether load is less than a preset threshold.

802-1 and 802-2. The processor 311 of the central processing unit 310 executes the analysis instruction in the memory 313, and performs 803 if it is satisfied that load information of the central processing unit 310 indicates that load of the central processing unit 310 is greater than a load threshold of the central processing unit (802-1), and the status information of the second sensor processing unit indicates that the second sensor processing unit is capable of processing the data processing task of the central processing unit 310; or performs 804 if it is satisfied that the status information of the first sensor processing unit indicates that the first sensor processing unit is incapable of processing the data processing task of the first sensor processing unit (802-2).

In a possible implementation, if the hardware, the software, or the like of the central processing unit 310 is faulty or has an alarm, or there is another problem that affects data processing, 803 is performed.

In a possible implementation, if the status information of the central processing unit 310 indicates that the central processing unit 310 is incapable of completing the data processing task, 803 is performed.

That the second sensor processing unit is capable of processing the data processing task of the central processing unit 310 may indicate that the hardware, the software, and the like of the second sensor processing unit operate normally, and the load of the second sensor processing unit is less than the preset threshold. When the status information of the first sensor processing unit indicates that the first sensor processing unit is incapable of processing the data processing task of the first sensor processing unit, it indicates that the hardware and/or the software of the first sensor processing unit is faulty or operates abnormally, and/or the load of the first sensor processing unit is greater than the preset threshold.

In a possible implementation, if the status information of the central processing unit 310 indicates that the central processing unit is capable of processing the data processing task of the central processing unit 310, or the status information of the first sensor processing unit indicates that the first sensor processing unit is capable of processing the data processing task of the first sensor processing unit, no switching is performed.

803. The processor 311 of the central processing unit 310 executes the analysis instruction in the memory 313, to determine task switching information to be switching from the central processing unit 310 to the second sensor processing unit, which is used to indicate to switch the data processing task from the central processing unit to the second sensor processing unit.

804. The processor 311 of the central processing unit 310 executes the analysis instruction in the memory 313, to determine task switching information to be switching from the first sensor processing unit to the central processing unit 310, which is used to indicate to switch the data processing task from the first sensor processing unit to the central processing unit 310.

For example, as shown in FIG. 6, at that moment, the first sensor processing unit is the sensor processing unit 322, and the sensor processing unit 322 is about to start a next cycle of data abstraction processing. However, the status information of the sensor processing unit 322 that is obtained by the central processing unit 310 indicates that the sensor processing unit 322 is incapable of completing the next cycle of data abstraction processing corresponding to the sensor processing unit 322 due to problems of load, hardware, or software, and the central processing unit 310 determines the task switching information to be switching a data abstraction processing task of the sensor processing unit 322 to the central processing unit 310. The sensor processing unit 322 stops performing the next cycle of data abstraction processing based on the task switching information, and transmits the initial signal to the central processing unit 310.

The central processing unit 310 completes a data abstraction processing task based on the task switching information.

For another example, as shown in FIG. 7, before the central processing unit 310 starts performing data abstraction on the initial signal of the sensor processing unit 342, because the status information of the central processing unit 310 indicates that the central processing unit 310 is incapable of completing the data abstraction task due to a problem of load, hardware, or software, the central processing unit 310 determines to switch the data abstraction task back to the sensor processing unit 342.

It should be noted that FIG. 7 is only an example. In actual application, the central processing unit 310 can also obtain status information of any sensor processing unit other than the sensor processing unit 342, and when switching is required, switch, to any sensor processing unit in the sensor processing unit set, the data processing task corresponding to the sensor processing unit 342.

It should be noted that if switching is determined, data processing tasks being processed concurrently by the central processing unit 310 may be switched, or only a data processing task corresponding to one or several specific sensor processing units may be switched, or switching may be performed according to a preset rule. For example, resources required for the data processing tasks may be ranked, or an amount of processed data is ranked, or switching processing may be performed based on a preset processing priority. For example, the preset processing priority is behavior decision-making>data fusion>data abstraction. In this case, when the task switching information is determined, if the central processing unit 310 is incapable of completing the data processing task due to a problem of load, hardware, or software, switching may be performed in a sequence of data abstraction, data fusion, and behavior decision-making. To be specific, the data abstraction task is first released to the sensor processing unit. If a subsequent data processing task still cannot be completed, a data fusion task is further discarded, and if a subsequent data processing task still cannot be completed, a behavior decision-making task is further released.

Further, step 501 may include at least one of the following:
before the at least one sensor processing unit in the sensor processing unit set starts performing data abstraction, the central processing unit 310 obtains status information of at least one sensor; before the central processing unit starts performing data abstraction, the central processing unit obtains the status information of the at least one sensor processing unit; before the central processing unit starts performing data fusion, the central processing unit obtains the status information of the at least one sensor processing unit; before the central processing unit starts performing behavior decision-making, the central processing unit obtains the status information of the at least one sensor processing unit; or before the at least one sensor processing unit in the sensor processing unit set starts performing behavior decision-making, the central processing unit obtains the status information of the at least one sensor processing unit.

Optionally, the central processing unit 310 may also obtain the status information of the at least one sensor in a process of performing a specific data processing task such as data abstraction, data fusion, or behavior decision-making. Timing for obtaining the status information is not limited in embodiments of this application.

Further, if before the first sensor processing unit starts performing behavior decision-making, the task switching information is for switching the data processing task from the sensor processing unit to the central processing unit 310, or if before the first sensor processing unit starts performing behavior decision-making, the task switching information is for switching the data processing task from the sensor processing unit to the central processing unit 310, that the central processing unit 310 processes the data processing task switched from the first sensor processing unit to the central processing unit may include: stopping, by the first sensor processing unit, a data abstraction task, and switching the data abstraction task to the central processing unit 310; and performing, by the central processing unit 310, data abstraction to obtain abstract data; or stopping, by the first sensor processing unit, a behavior decision-making task, and switching the behavior decision-making task to the central processing unit 310; and performing, by the central processing unit 310, behavior decision-making.

Figure 9:
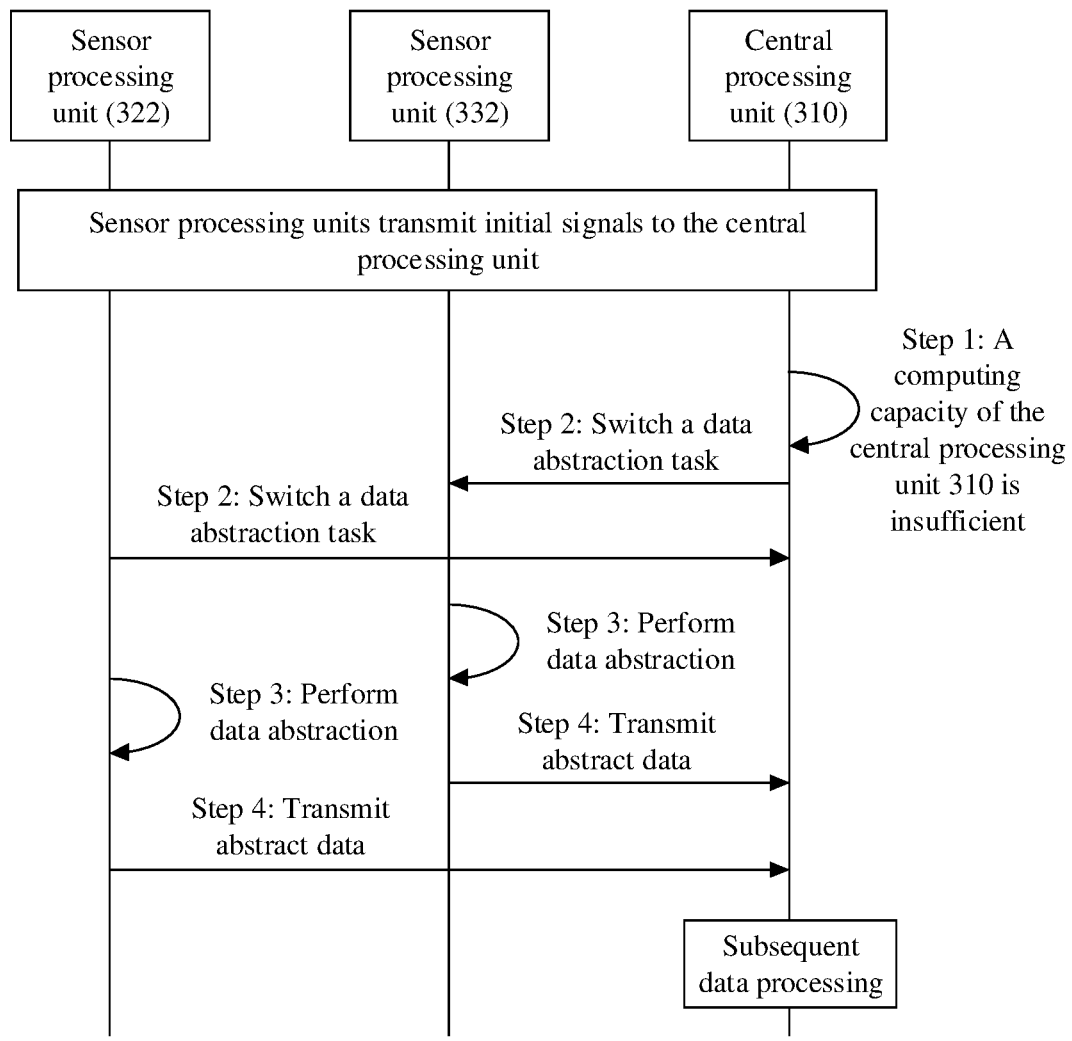
FIG. 9 is an example 1 of a data processing procedure according to an embodiment of this application.

FIG. 9 is an example 1 of a data processing procedure according to an embodiment of this application. As shown in FIG. 9, a sensor processing unit 322 and a sensor processing unit 332 transmit initial signals that are initially processed by the sensor processing unit 322 and the sensor processing unit 332 to a central processing unit 310 for subsequent processing. The central processing unit 310 analyzes status information of the central processing unit 310 and finds that a computing capacity of the central processing unit 310 is insufficient due to overload. Therefore, the central processing unit 310 switches a data abstraction task planned to be processed by the central processing unit 310 to the sensor processing unit 322 and the sensor processing unit 332 for implementation. After completing the data processing task switched from the central processing unit 310, the sensor processing unit 322 and the sensor processing unit 332 separately transmit obtained abstract data to the central processing unit 310, and the central processing unit 310 implements subsequent processing.

Figure 10:
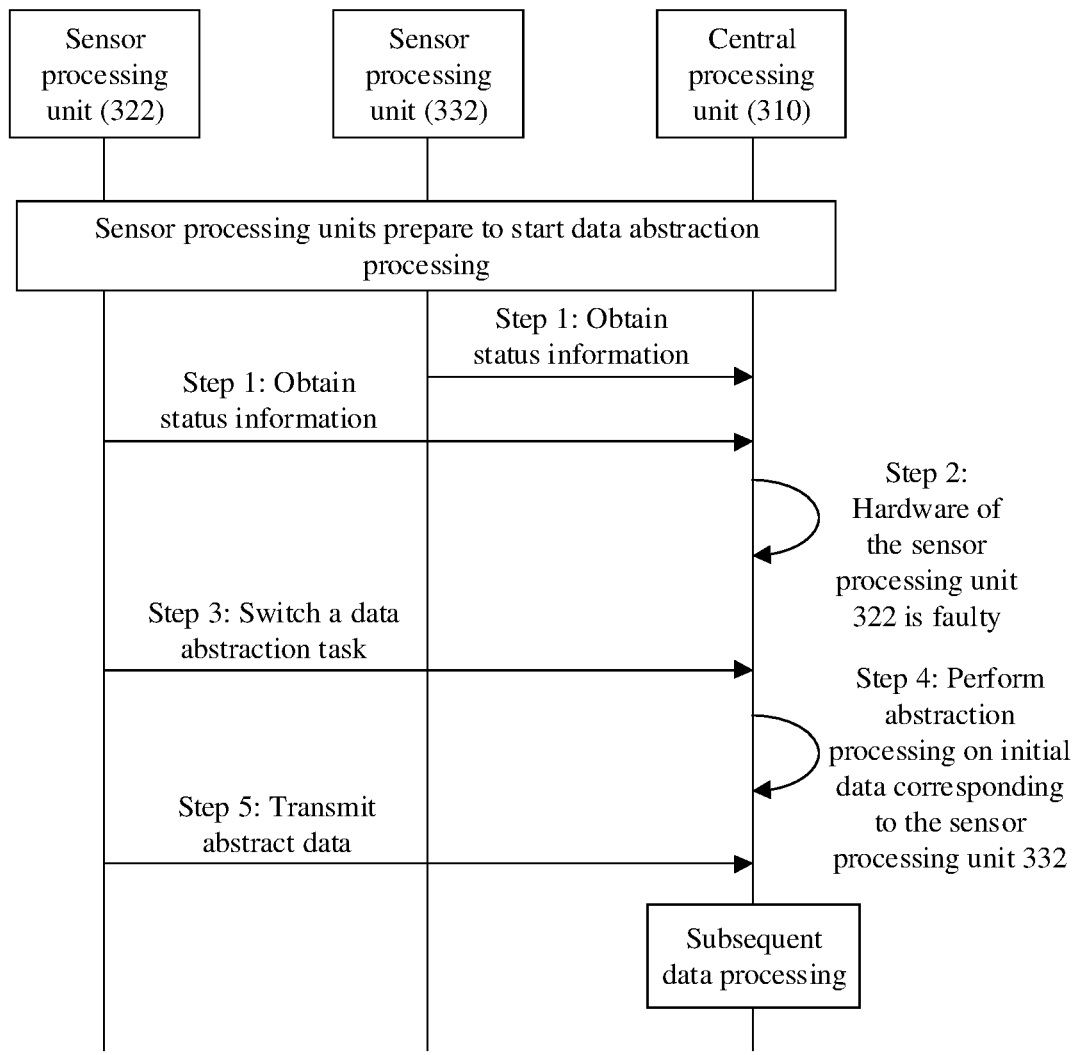
FIG. 10 is an example 2 of a data processing procedure according to an embodiment of this application.

FIG. 10 is an example 2 of a data processing procedure according to an embodiment of this application. As shown in FIG. 10, a sensor processing unit 322 and a sensor processing unit 332 prepare to perform data abstraction processing on initial signals. A central processing unit 310 analyzes obtained status information of the sensor processing unit 322 and the sensor processing unit 332 and finds that hardware of the sensor processing unit 322 is faulty and is incapable of completing a data abstraction processing task corresponding to the sensor processing unit 322. Therefore, the central processing unit 310 transmits task switching information to switch the data abstraction processing task corresponding to the sensor processing unit 322 to the central processing unit 310 for implementation. However, a data abstraction processing task corresponding to the sensor processing unit 332 can still be processed by the sensor processing unit 332 due to a sufficient capability of the sensor processing unit 332, and therefore the sensor processing unit 332 continues processing and transmits abstract data to the central processing unit 310; and the central processing unit 310 implements subsequent processing.

In a possible implementation, if during data abstraction performed by the first sensor processing unit, the task switching information is for switching the data processing task from the sensor processing unit to the central processing unit, or if during behavior decision-making performed by the first sensor processing unit, the task switching information is for switching the data processing task from the sensor processing unit to the central processing unit, the first sensor stops a data abstraction task, and switches the data abstraction task to the central processing unit 310; and the central processing unit 310 performs data abstraction to obtain abstract data; or the first sensor processing unit stops a behavior decision-making task, and switches the behavior decision-making task to the central processing unit 310; and the central processing unit 310 performs behavior decision-making.

Figure 11:
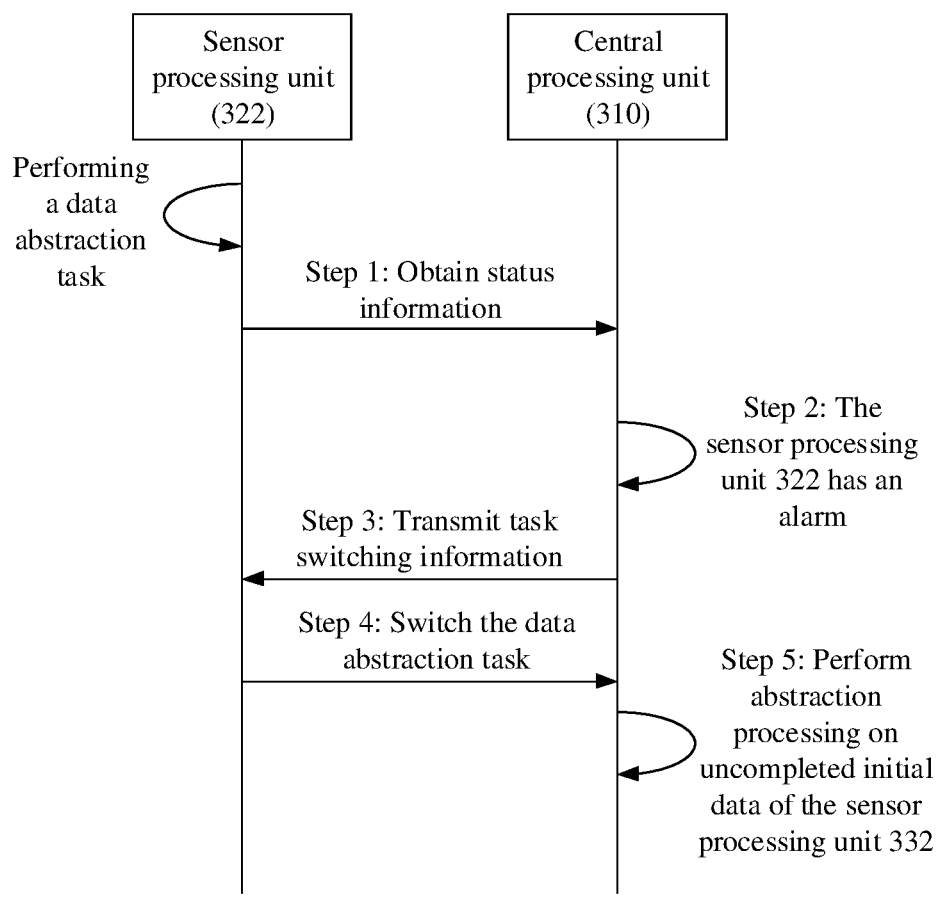
FIG. 11 is an example 3 of a data processing procedure according to an embodiment of this application.

FIG. 11 is an example 3 of a data processing procedure according to an embodiment of this application. As shown in FIG. 11, a sensor processing unit 322 is performing a data abstraction task. A central processing unit 310 analyzes obtained status information of the sensor processing unit 322 and finds that the sensor processing unit 322 has an alarm, and smooth implementation of a data abstraction task cannot be ensured. Therefore, the central processing unit 310 transmits task switching information to switch the data abstraction task that has not been completed by the sensor processing unit 322 to the central processing unit 310 for implementation. The sensor processing unit 322 terminates the current data abstraction task based on the task switching information and switches the uncompleted data abstraction task to the central processing unit 310 for implementation.

Optionally, if before the central processing unit 310 starts performing data abstraction, the task switching information is for switching the data processing task from the central processing unit 310 to the sensor processing unit, or if before the central processing unit 310 starts performing data fusion, the task switching information is for switching the data processing task from the central processing unit 310 to the sensor processing unit, that the second sensor processing unit processes the data processing task switched from the central processing unit 310 to the second sensor processing unit may include: stopping, by the central processing unit 310, a data abstraction task, and switching the data abstraction task to the second sensor processing unit; and performing, by the second sensor processing unit, data abstraction to obtain abstract data; or stopping, by the central processing unit 310, a data fusion task, and switching the data fusion task to the second sensor processing unit; and performing, by the second sensor processing unit, behavior decision-making.

In a possible implementation, if during data abstraction performed by the central processing unit 310, the task switching information is for switching the data processing task from the central processing unit 310 to the sensor processing unit, or if during data fusion performed by the central processing unit 310, the task switching information is for switching the data processing task from the central processing unit 310 to the sensor processing unit, the central processing unit 310 stops a data abstraction task, and switches the data abstraction task to the second sensor processing unit; and the second sensor processing unit performs data abstraction to obtain abstract data; or the central processing unit 310 stops a data fusion task, and switches the data fusion task to the second sensor processing unit; and the second sensor processing unit performs behavior decision-making.

In a possible implementation, if the central processing unit 310 receives an initial signal and first abstract data transmitted by the sensor processing unit, load of the central processing unit 310 is normal, hardware, software, and the like of the central processing unit 310 operate normally, the central processing unit 310 performs data abstraction processing on the initial signal to obtain second abstract data, and performs deterministic processing based on the second abstract data and the first abstract data obtained from the sensor processing unit, to obtain the abstract data.

Figure 12:
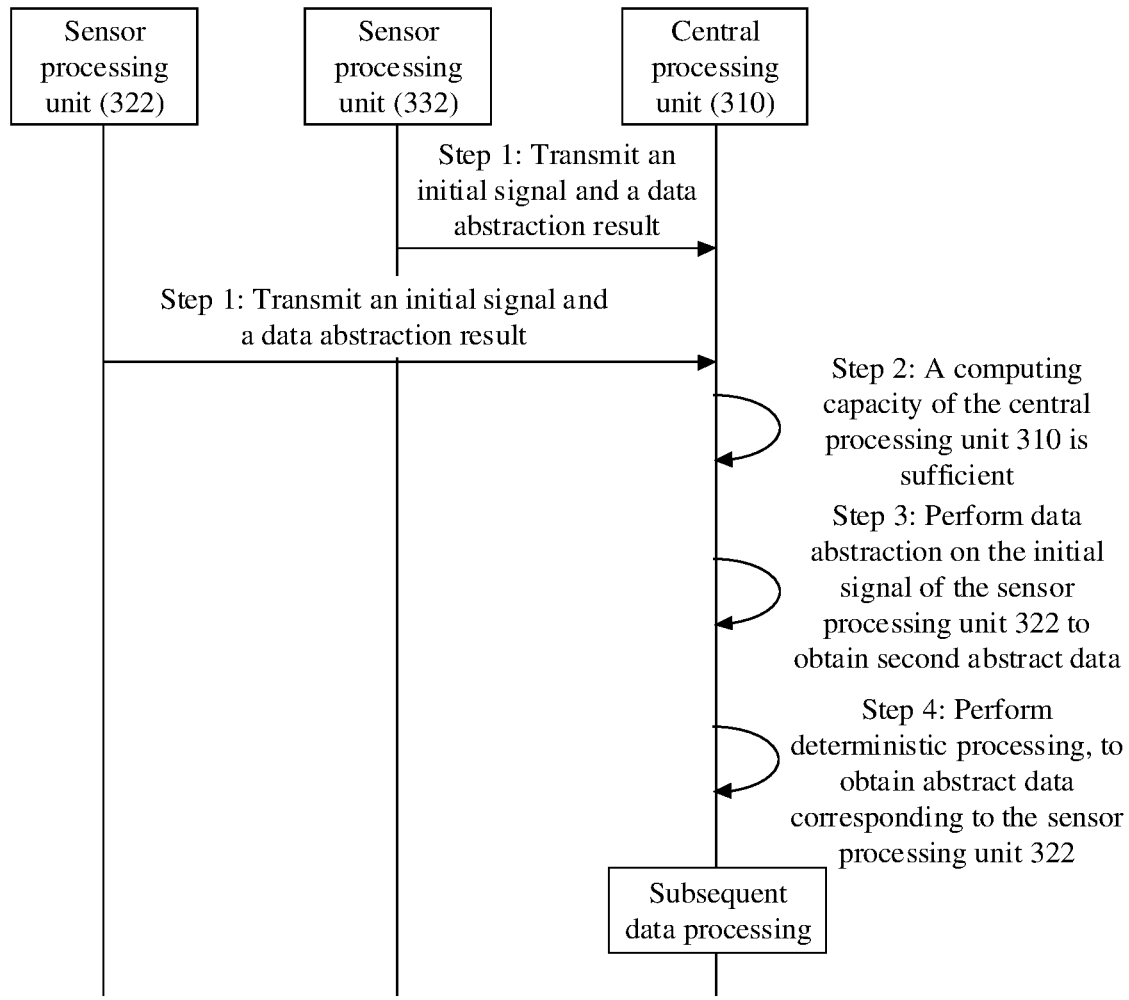
FIG. 12 is an example 4 of a data processing procedure according to an embodiment of this application.

FIG. 12 is an example 4 of a data processing procedure according to an embodiment of this application. As shown in FIG. 12, a sensor processing unit 322 and a sensor processing unit 332 transmit initial signals initially processed by the sensor processing unit 322 and the sensor processing unit 332, and a result of data abstraction to a central processing unit 310. The central processing unit 310 analyzes status information of the central processing unit 310 and finds that a computing capacity of the central processing unit 310 is sufficient to complete deterministic processing on abstract data of the sensor processing unit 322. Therefore, the central processing unit 310 performs abstraction processing on the initial signal transmitted by the sensor processing unit 322 to obtain second abstract data, performs deterministic processing based on the second abstract data and first abstract data of the sensor processing unit 322, to obtain abstract data, and performs data fusion and subsequent processing on the abstract data and abstract data corresponding to the sensor processing unit 332.

It should be noted that the deterministic processing may be weighted processing of the first abstract data and the second abstract data, or may be determining final abstract data according to another preset rule.

For example, the central processing unit 310 may compare first abstract data and second abstract data corresponding to N characteristic points and/or L target objects. If a difference between first abstract data and second abstract data that are corresponding to a characteristic point i is less than a first error threshold, abstract data corresponding to the characteristic point i is the first abstract data or second abstract data corresponding to the characteristic point i; or if a difference between first abstract data and second abstract data corresponding to a target object j is less than a second error threshold, abstract data corresponding to the target object j is the first abstract data or second abstract data corresponding to the target object j.

Optionally, if the difference between the first abstract data and the second abstract data that are corresponding to the characteristic point i is greater than the first error threshold, weighted averaging on the first abstract data or second abstract data corresponding to the characteristic point is performed based on preset weights, to obtain the abstract data corresponding to the characteristic point i; or if the difference between the first abstract data and the second abstract data that are corresponding to the target object j is greater than the second error threshold, weighted averaging on the first abstract data or second abstract data corresponding to the target object j is performed based on preset weights, to obtain the abstract data corresponding to the target object j. The characteristic point i is any one of the N characteristic points, and the target object j is any one of the L target objects.

Further, if before the central processing unit 310 starts performing data fusion, load information of the central processing unit 310 indicates that load of the central processing unit 310 is less than a load threshold of the central processing unit 310, the central processing unit 310 performs data fusion to obtain fused data. The fused data may include at least one of: spatial location information and a speed of each characteristic point or each target object; an attribute of each characteristic point or each target object; or current environment information. The fused data is used to provide attribute information such as a surrounding object, and a shape and a material of the object, object motion information, current environment information, and the like, and may also include other reference information for behavior decision-making. This is not limited in embodiments of this application.

Figure 13:
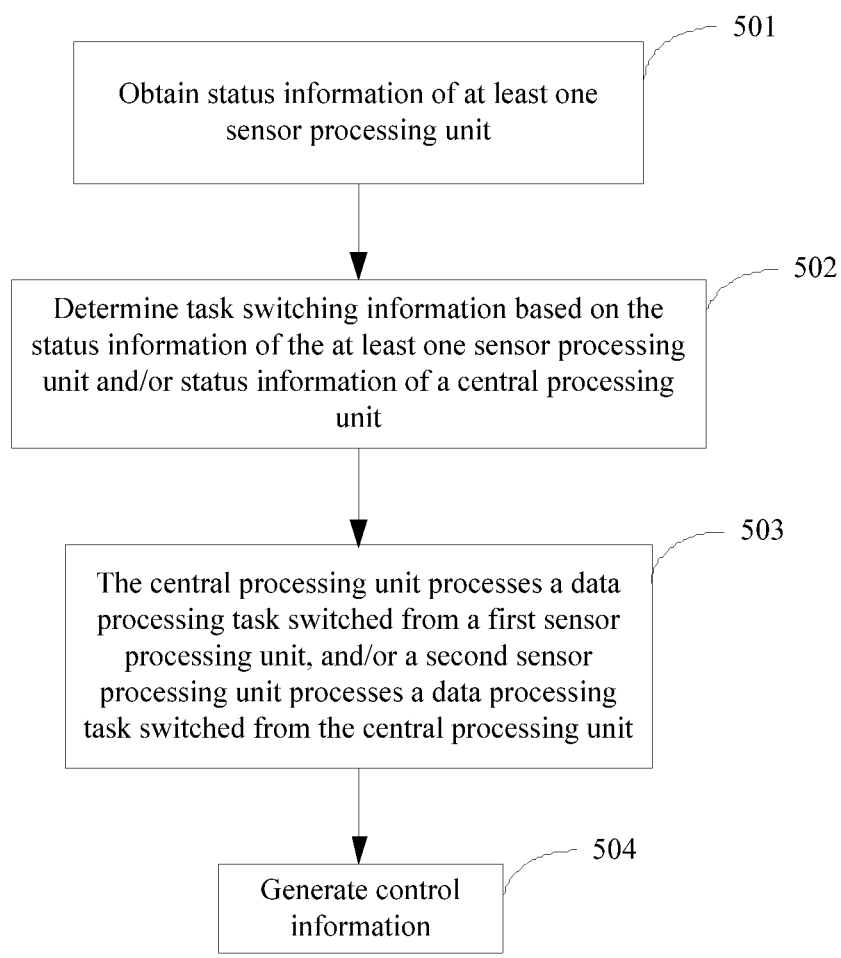
FIG. 13 is a flowchart of another data processing method according to an embodiment of this application.

Optionally, FIG. 13 is a flowchart of another data processing method according to an embodiment of this application. After step 503, the method may further include the following step.

504. A processor 311 of a central processing unit 310 executes one or more data processing instructions in a memory 313, and/or a processor 3221 of a sensor processing unit 322 executes one or more data processing instructions in a memory 3223, to generate control information, where the control information may include acceleration, deceleration, stopping, turning right, turning left, or turning around.

In the embodiments of this application, functional modules may be divided on a server. For example, various functional modules may be divided for various corresponding functions, or at least two functions may be integrated into one processing module. The integrated module may be implemented in a form of hardware, or may be implemented in a form of a software functional module. It should be noted that, in this embodiment of this application, module division is an example, and is merely a logical function division. In actual implementation, another division manner may be used.

Figure 14:
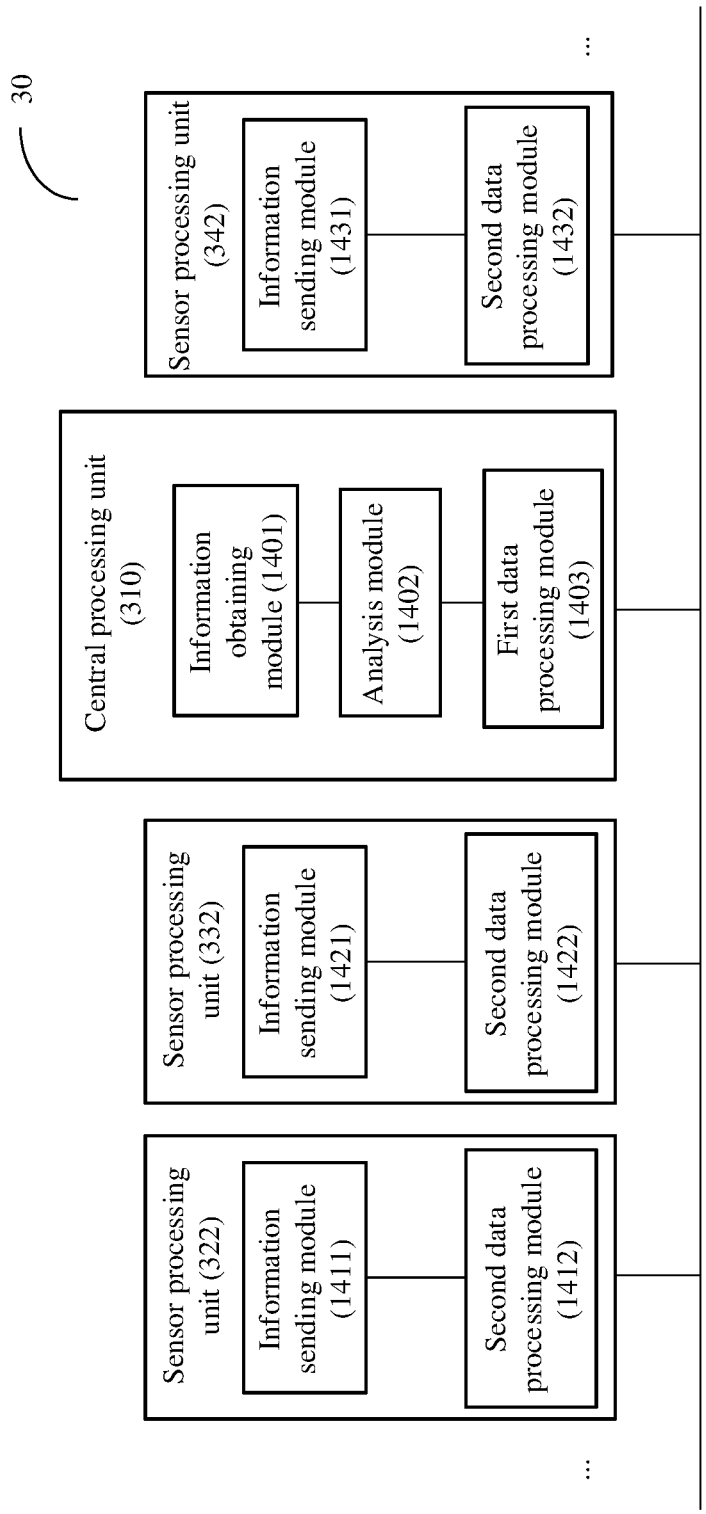
FIG. 14 is a schematic structural diagram of a data processing apparatus according to an embodiment of this application.

For example, in a case in which the functional modules are divided in an integration manner, FIG. 14 is a schematic structural diagram of a data processing apparatus 30 according to an embodiment of this application. The data processing apparatus 30 may include a central processing unit 310 and a sensor processing unit set. The sensor processing unit set includes at least one sensor processing unit, and the central processing unit 310 may include an information obtaining module 1401, an analysis module 1402, and a first data processing module 1403. Each sensor processing unit may include an information sending module and a second data processing module. For example, the sensor processing unit 322 includes an information sending module 1411 and a second data processing module 1412, and the sensor processing unit 332 includes an information sending module 1421 and a second data processing module 1422. The information obtaining module 1401 is configured to obtain status information of the at least one sensor processing unit in the sensor processing unit set. The analysis module 1402 is configured to determine task switching information based on the status information of the at least one sensor processing unit and/or status information of the central processing unit 310, where the task switching information is used to indicate to switch a data processing task of a first sensor processing unit to the central processing unit 310, or switch a data processing task of the central processing unit 310 to a second sensor processing unit; and the first sensor processing unit and the second sensor processing unit each is any sensor processing unit in the sensor processing unit set. The first data processing module 1403 is configured to process the data processing task switched from the first sensor processing unit to the central processing unit 310. The second data processing module 1412 is configured to process the data processing task switched from the central processing unit 310 to the second sensor processing unit.

Optionally, the status information may include but is not limited to capability information and load information; and the task switching information may include: switching a data processing task from a sensor processing unit to the central processing unit 310, or switching the data processing task from the central processing unit 310 to a sensor processing unit. That the analysis module 1402 determines the task switching information based on the status information of the at least one sensor processing unit and/or the status information of the central processing unit 310 may include: if it is satisfied that load information of the central processing unit 310 indicates that load of the central processing unit 310 is greater than a load threshold of the central processing unit, and status information of the second sensor processing unit indicates that the second sensor processing unit is capable of processing the data processing task of the central processing unit 310, the task switching information is for switching from the central processing unit to the second sensor processing unit, and is used to indicate to switch the data processing task from the central processing unit 310 to the second sensor processing unit; or if it is satisfied that status information of the first sensor processing unit indicates that the first sensor processing unit is incapable of processing the data processing task of the first sensor processing unit, the task switching information is for switching from the first sensor processing unit to the central processing unit 310, and is used to indicate to switch the data processing task from the first sensor processing unit to the central processing unit 310.

Optionally, the data processing task may include but is not limited to at least one of: data abstraction, data fusion, or behavior decision-making.

Optionally, the information obtaining module 1401 is further configured to: before the second data processing module of the at least one sensor processing unit in the sensor processing unit set starts performing data abstraction, obtain status information of at least one sensor; before the first data processing module of the central processing unit starts performing data abstraction, obtain the status information of the at least one sensor processing unit; before the first data processing module of the central processing unit 310 starts performing data fusion, obtain the status information of the at least one sensor processing unit; before the first data processing module of the central processing unit 310 starts performing behavior decision-making, obtain the status information of the at least one sensor processing unit; or before the second data processing module of the at least one sensor processing unit in the sensor processing unit set starts performing behavior decision-making, obtain the status information of the at least one sensor processing unit.

Optionally, if before a second data processing module of the first sensor processing unit starts performing data abstraction, the task switching information is for switching the data processing task from the sensor processing unit to the central processing unit 310, or if before the second data processing module of the first sensor processing unit starts performing behavior decision-making, the task switching information is for switching the data processing task from the sensor processing unit to the central processing unit 310, the second data processing module 1412 of the first sensor processing unit may be configured to stop a data abstraction task and switch the data abstraction task to the central processing unit 310, and the first data processing module 1403 of the central processing unit 310 may be configured to perform data abstraction to obtain abstract data; or the second data processing module 1412 of the first sensor processing unit is configured to stop a behavior decision-making task, and switch the behavior decision-making task to the central processing unit 310, and the first data processing module 1403 of the central processing unit 310 is configured to perform behavior decision-making.

Optionally, if before the first data processing module of the central processing unit 310 starts performing data abstraction, the task switching information is for switching the data processing task from the central processing unit 310 to the sensor processing unit, or if before the first data processing module 1403 of the central processing unit 310 starts performing data fusion, the task switching information is for switching the data processing task from the central processing unit 310 to the sensor processing unit, the first data processing module 1403 of the central processing unit 310 may be configured to stop a data abstraction task and switch the data abstraction task to the second sensor processing unit, and the second data processing module 1422 of the second sensor processing unit is configured to perform data abstraction to obtain abstract data; or the first data processing module 1403 of the central processing unit 310 is configured to stop a data fusion task, and switch the data fusion task to the second sensor processing unit, and the second data processing module 1422 of the second sensor processing unit is configured to perform behavior decision-making.

Optionally, the data abstraction may include: determining, based on initial data, N characteristic points corresponding to the initial data; determining, based on the initial data, N characteristic points corresponding to an initial signal; determining M characteristic faces based on the N characteristic points; and determining L target objects based on the M characteristic faces.

Optionally, each sensor processing unit communicates with the central processing unit 310 through the Ethernet.

Further, if before the first data processing module of the central processing unit 310 starts performing data fusion, the load information of the central processing unit 310 indicates that the load of the central processing unit 310 is less than the load threshold of the central processing unit, the first data processing module 1403 of the central processing unit 310 is further configured to perform data fusion to obtain fused data. The fused data includes at least one of: spatial location information and a speed of each characteristic point or each target object; an attribute of each characteristic point or each target object; or current environment information.

It should be noted that the first sensor processing unit and the second sensor processing unit each is any sensor processing unit, satisfying a corresponding switching condition, in the sensor processing unit set.

In FIG. 14, an example in which the first sensor processing unit is the sensor processing unit 322 and the second sensor processing unit is the sensor processing unit 332 is used for description. In addition, FIG. 14 is merely used as an example, and the data processing apparatus 30 may further include other sensor processing units.

Optionally, the first data processing module 1403 of the central processing unit 310 or the second data processing module 1412 of the first sensor processing unit may be further configured to obtain control information, where the control information includes acceleration, deceleration, stopping, turning right, turning left, or turning around.

The foregoing descriptions about implementations allow a person skilled in the art to understand that, for the purpose of convenient and brief description, division of the foregoing functional modules is taken as an example for illustration. In actual application, the foregoing functions can be allocated to different modules and implemented according to a requirement, that is, an inner structure of an apparatus is divided into different functional modules to implement all or some of the functions described above.

In the embodiments provided in this application, it should be understood that the disclosed apparatus and method may be implemented in other manners. For example, the described apparatus embodiment is merely an example. For example, the module or unit division is merely logical function division and may be other division in actual implementation. For example, a plurality of units or components may be combined or integrated into another apparatus, or some features may be ignored or not performed. In addition, the displayed or discussed mutual couplings or direct couplings or communication connections may be implemented by using some interfaces. The indirect couplings or communication connections between the apparatuses or units may be implemented in electronic, mechanical, or other forms.

The units described as separate parts may or may not be physically separate, and parts displayed as units may be one or more physical units, may be located in one place, or may be distributed on different places. Some or all of the units may be selected based on actual requirements to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a readable storage medium. Based on such an understanding, the technical solutions of this application essentially, or the part contributing to the prior art, or all or some of the technical solutions may be implemented in the form of a software product. The software product is stored in a storage medium and includes several instructions for instructing a device (which may be a single-chip microcomputer, a chip or the like) or a processor to perform all or some of the steps of the methods described in the embodiments of this application. The foregoing storage medium includes: any medium that can store program code, such as a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement within the technical scope disclosed in this application shall fall within the protection scope of this application. Therefore, the claims shall define the protection scope.

What is claimed is:

1. A method executed by a central processor comprising:
    transmitting a first task to a first sensor processor based on a first capability of the first sensor processor indicating that the first sensor processor is capable of executing the first task and a computing capacity of the central processor being insufficient to execute the first task due to a load of the central processor being greater than a load threshold, wherein the first capability is based on a hardware capability, a software capability, and a computing capacity of the first sensor processor, and wherein the first sensor processor executes the first task using first data received from a first sensor to produce a first result based on a first error threshold;
    receiving the first result from the first sensor processor;
    receiving a second task from a second sensor processor based on a second capability of the second sensor processor indicating that the second sensor processor is incapable of executing the second task and the computing capacity of the central processor being sufficient to execute the second task due to the load of the central processor being less than the load threshold, wherein the second capability is based on a hardware capability, a software capability, and a computing capacity of the second sensor processor;

executing the second task using second data received from a second sensor to produce a second result based on a second error threshold, wherein the first sensor processor and the second sensor processor comprise a sensor processor set; and controlling operation of a vehicle based on a weighted average of the first result and the second result, wherein the central processor, the first sensor processor, the second sensor processor, the first sensor, and the second sensor are mounted on the vehicle.

2. The method according to claim 1, wherein the first task and the second task comprise at least one of: a data abstraction task, a data fusion task, or a behavior decision-making task.

3. The method according to claim 1, wherein the first sensor processor and the second sensor processor communicate with the central processor through an Ethernet connection.

4. The method according to claim 1, wherein the first data and the second data comprise environment information associated with the vehicle.

5. The method according to claim 1, wherein controlling operation of the vehicle comprises controlling acceleration, deceleration, stopping, turning right, turning left, and/or turning around of the vehicle.

6. The method according to claim 1, wherein the first sensor and the second sensor comprise at least one of: a thermal sensor, an optical sensor, a gas sensor, a force sensor, a magnetic sensor, a moisture sensor, a temperature sensor, a distance sensor, a pressure sensor, an acceleration sensor, a sound sensor, and a radiation sensor.

7. The method according to claim 1, wherein a respective hardware capability of the central processor, the first sensor processor, and the sensor second processor indicates whether respective hardware of the central processor, the first sensor processor, and the second sensor processor is faulty.

8. The method according to claim 1, wherein the central processor is a single-core processor or a multi-core processor.

9. The method according to claim 1, wherein the vehicle is a vessel, an airplane, a drone, or a robot.

10. The method according to claim 1, wherein central processor, the first sensor processor, and the second sensor processor each are connected to a respective memory through at least one respective communications interface.

11. An apparatus comprising a central processor and a memory storing instructions that, when executed by the central processor, cause the apparatus to perform operations comprising:

transmitting a first task to a first sensor processor based on a first capability of the first sensor processor indicating that the first sensor processor is capable of executing the first task and a computing capacity of the central processor being insufficient to execute the first task due to a load of the central processor being greater than a load threshold, wherein the first capability is based on a hardware capability, a software capability, and a computing capacity of the first sensor processor, and wherein the first sensor processor executes the first task using first data received from a first sensor to produce a first result based on a first error threshold;

receiving the first result from the first sensor processor;

receiving a second task from a second sensor processor based on a second capability of the second sensor processor indicating that the second sensor processor is incapable of executing the second task and the computing capacity of the central processor being sufficient to execute the second task due to the load of the central processor being less than the load threshold, wherein the second capability is based on a hardware capability, a software capability, and a computing capacity of the second sensor processor;

executing the second task using second data received from a second sensor to produce a second result based on a second error threshold, wherein the first sensor processor and the second sensor processor comprise a sensor processor set; and controlling operation of a vehicle based on a weighted average of the first result and the second result, wherein the central processor, the first sensor processor, the second sensor processor, the first sensor, and the second sensor are mounted on the vehicle.

12. The apparatus according to claim 11, wherein the first task and the second task comprise at least one of: a data abstraction task, a data fusion task, or a behavior decision-making task.

13. The apparatus according to claim 11, wherein the first sensor processor and the second sensor processor communicate with the central processor through an Ethernet connection.

14. The apparatus according to claim 11, wherein the first data and the second data comprise environment information associated with the vehicle.

15. The apparatus according to claim 11, wherein controlling operation of the vehicle comprises controlling acceleration, deceleration, stopping, turning right, turning left, and/or turning around of the vehicle.

16. The apparatus according to claim 11, wherein the first sensor and the second sensor comprise at least one of: a thermal sensor, an optical sensor, a gas sensor, a force sensor, a magnetic sensor, a moisture sensor, a temperature sensor, a distance sensor, a pressure sensor, an acceleration sensor, a sound sensor, and a radiation sensor.

17. The apparatus according to claim 11, wherein a respective hardware capability of the central processor, the first sensor processor, and the second sensor processor indicates whether respective hardware of the central processor, the first sensor processor, and the second sensor processor is faulty.

18. The apparatus according to claim 11, wherein the central processor is a single-core processor or a multi-core processor.

19. The apparatus according to claim 11, wherein the vehicle is a vessel, an airplane, a drone, or a robot.

20. The apparatus according to claim 11, wherein central processor, the first sensor processor, and the second sensor processor each are connected to a respective memory through at least one respective communications interface.

* * * * *